V. ODQUIST & H. H. LYCHE.
DOUBLE SEAMER.
APPLICATION FILED SEPT. 4, 1906.
926,591.
Patented June 29, 1909.
6 SHEETS—SHEET 2.
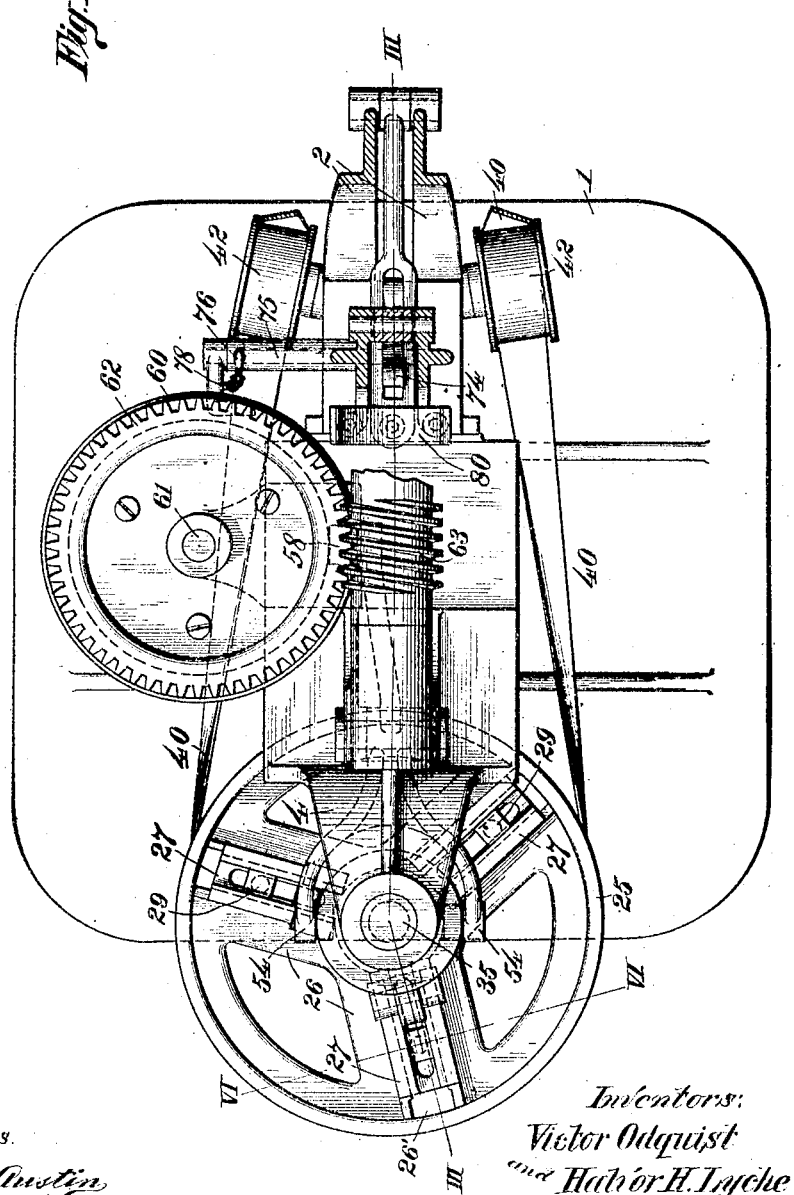
Fig. II.
Witnesses.
H. S. Austin
A. W. Nelson
Inventors:
Victor Odquist
and Halvor H. Lyche
by Charles
Atty.

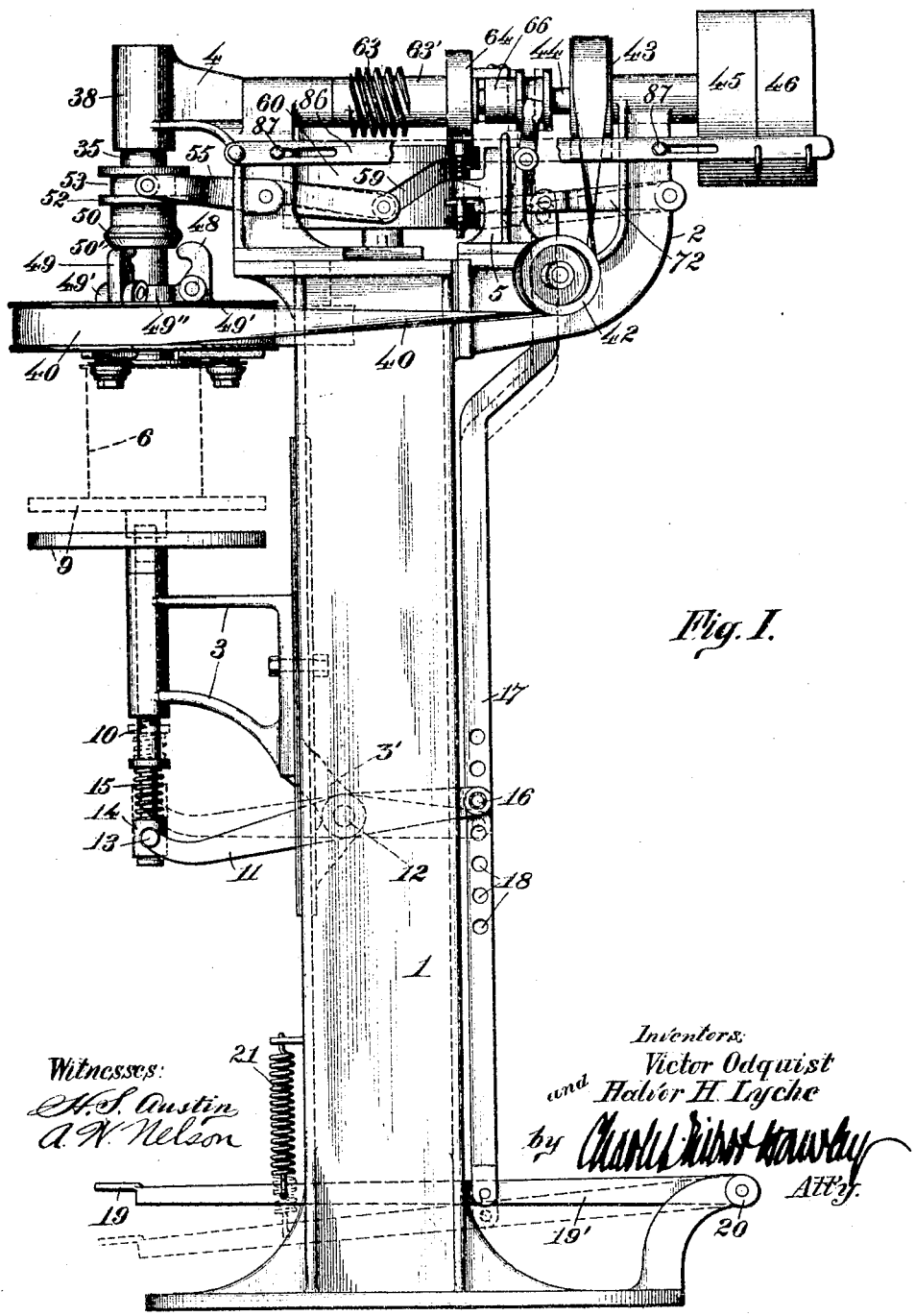
Fig. I.

V. ODQUIST & H. H. LYCHE.
DOUBLE SEAMER.
APPLICATION FILED SEPT. 4, 1906.
926,591.
Patented June 29, 1909.
6 SHEETS—SHEET 3.
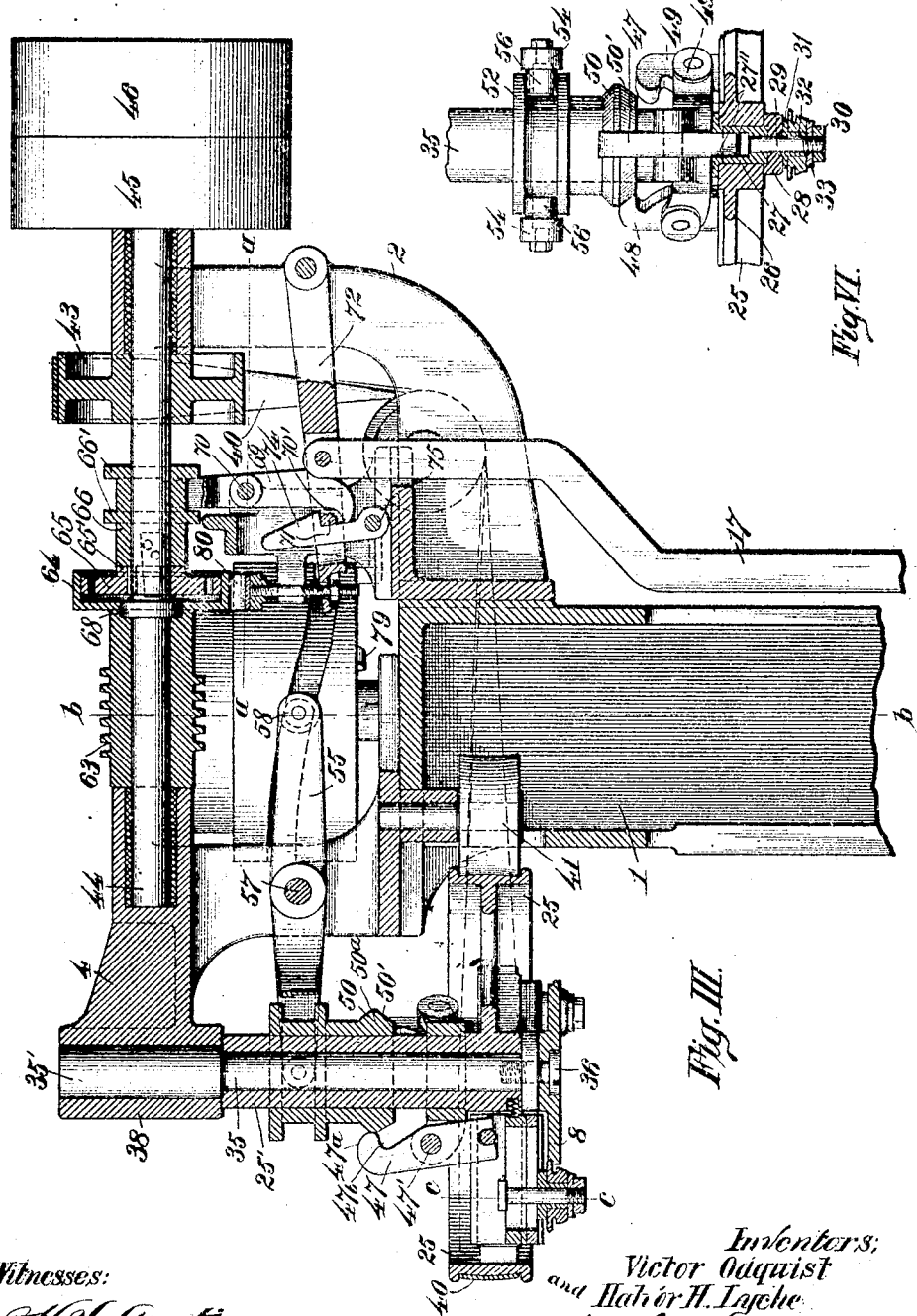
Witnesses:
H. S. Austin
A. W. Nelson
Inventors:
Victor Odquist
and Halvor H. Lyche
by Charles Robert Hawley
Atty.

V. ODQUIST & H. H. LYCHE.
DOUBLE SEAMER.
APPLICATION FILED SEPT. 4, 1906.
926,591.
Patented June 29, 1909.
6 SHEETS—SHEET 4.
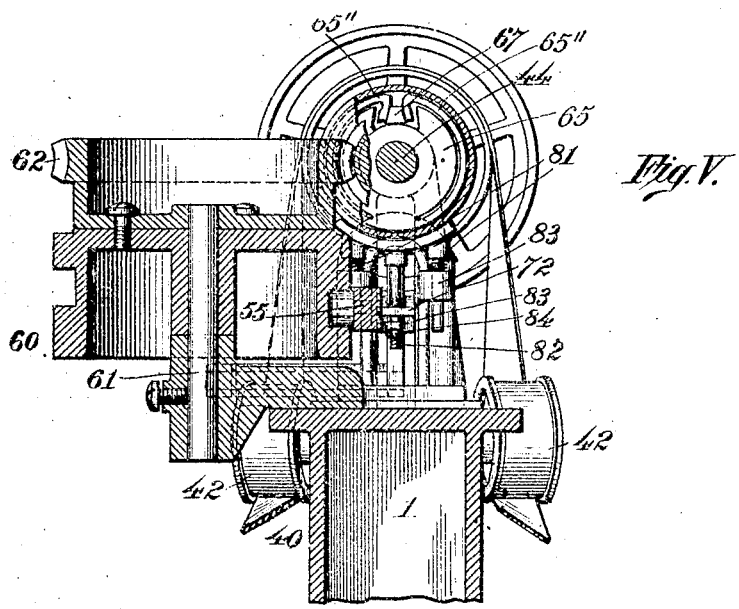
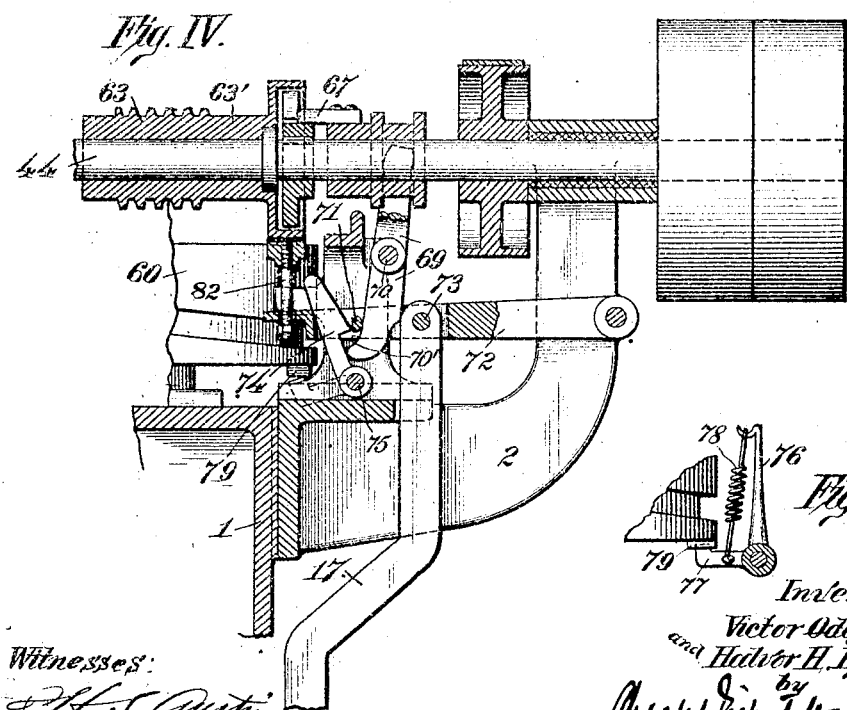
Witnesses:
H. S. Austin
A. W. Nelson
Inventors:
Victor Odquist
and Halvor H. Lyche
by
Atty.

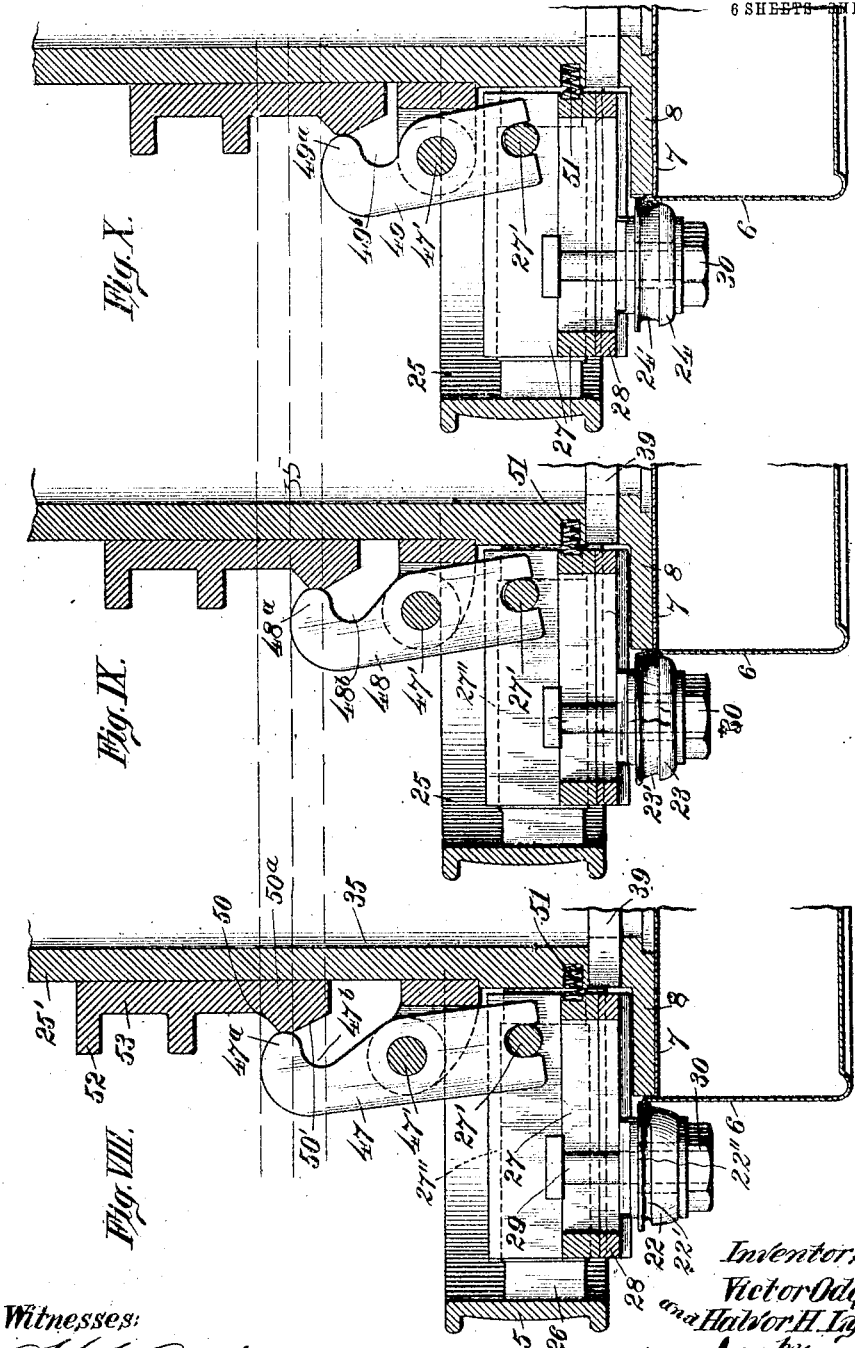

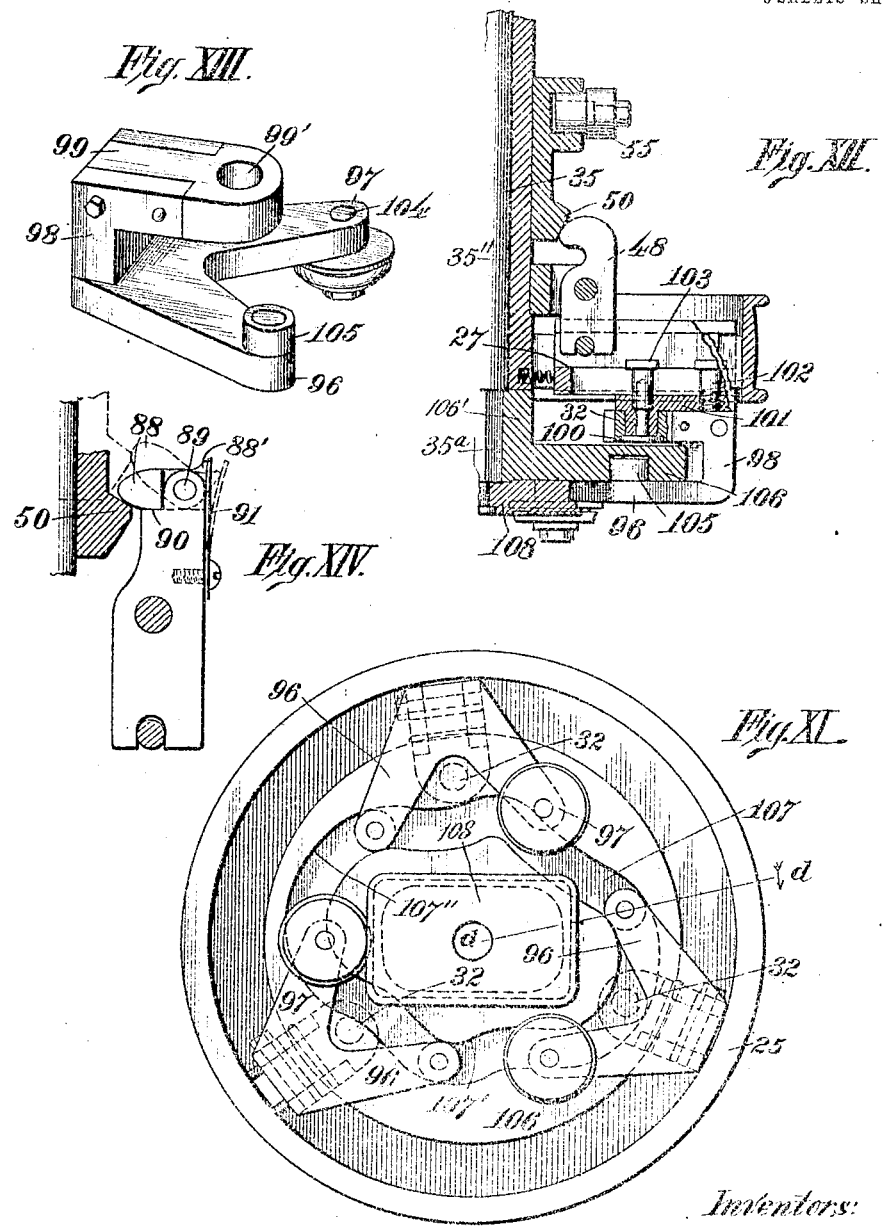

UNITED STATES PATENT OFFICE.

VICTOR ODQUIST AND HALVOR HEYERDAHL LYCHE, OF CHICAGO, ILLINOIS; SAID ODQUIST ASSIGNOR TO TORRIS WOLD & COMPANY, OF CHICAGO, ILLINOIS, A CORPORATION OF ILLINOIS.

DOUBLE SEAMER.

No. 926,591.   Specification of Letters Patent.   Patented June 29, 1909.

Application filed September 4, 1906. Serial No. 333,156.

*To all whom it may concern:*

Be it known that we, VICTOR ODQUIST and HALVOR HEYERDAHL LYCHE, citizens of the United States, and both residents of Chicago, county of Cook, and State of Illinois, have invented a certain new, useful, and Improved Double Seamer, of which the following is a full, clear, and exact description, such as will enable others skilled in the art to which it appertains to make and use the same.

Our invention relates to can-making machines, and has special reference to those machines which are employed for seaming can ends or heads upon can bodies, paint pails, and the like.

The can bodies and the can ends or heads which are delivered to such machines are both provided with flanges or extending edges, and the function of the machine is to turn and interlock these flanges to form a double seam and thereby tightly join the head to the can body.

The object of our invention is to provide a simple, compact, durable and efficient machine for "double seaming" can heads or caps upon can bodies.

Another object of the invention is to provide a machine of this character which shall be adapted for double seaming both round cans and rectangular or oblong cans.

A particular object of the invention is to provide a double seaming machine which after being set in operation shall automatically complete the necessary cycle of movements and then stop, preparatory to the removal of the completed can and the insertion of another.

Other objects of our invention will appear hereinafter.

Our invention consists, generally, in a can-end seaming machine having a nonrotative can holder, a plurality of consecutively-operating seaming rolls which travel around the can while seaming it, together with suitable automatic operating means associated with the parts mentioned. And further, our invention consists in a machine characterized as stated and wherein each of the planetary seaming rolls is automatically moved and positively held in operating position until it has performed its function, and is then automatically retracted while the following roll is operated in like manner. And further our invention consists in a main mechanism adapted to end-seaming round or cylindrical cans, and an attachment for said main mechanism which attachment is adapted for end-seaming rectangular cans of all proportions or dimensions. And further, our invention consists in various details of construction and combinations of parts, all as hereinafter described and particularly pointed out in the claims.

Our invention will be more readily understood by reference to the accompanying drawings forming a part of this specification, and in which—

Figure I is a side elevation of a machine embodying the invention; Fig. II is an enlarged plan view thereof, partly in section on line *a—a* of Fig. III; Fig. III is a central vertical section, partly in elevation, of the upper portion of the machine, showing one of the seaming rolls in operative position; Fig. IV is a view similar to Fig. III, of parts thereof, showing the positions of the parts at the moment when the machine is automatically stopped; Fig. V is a transverse vertical section taken on line *b—b* of Fig. III, the clutch and worm being partly broken away; Fig. VI is a front elevation of parts shown in Fig. III, being partly in section on line *c—c* of that figure; Fig. VII is a detail of the automatic stopping mechanism; Figs. VIII, IX, and X are enlarged sectional detail views showing the respective seaming rolls and a can as headed or seamed by their successive action; Fig. XI is a bottom plan view of a modified mechanism for double-seaming cans of other than circular shape; Fig. XII is a vertical section taken on line *d—d* of Fig. XI; Fig. XIII is an enlarged perspective detail view of one of the angular levers shown in Fig. XI; and Fig. XIV is a detail view of a modification of the lever 48.

As shown in the drawings, we prefer to place the working parts of our machine upon a standard, 1, carrying bracket portions 2, 3, 4, and 5, whereon the working members are arranged.

Before proceeding to the detailed description of our invention, the same will be preliminarily described to the end that its general construction and mode of operation may be understood at once. The can body (indicated at 6) is placed upon a rest, 9, below and concentric with a belt-driven wheel, 25, which carries the three seaming rolls, 22, 23, and 24. (Figs. VIII, IX, X.) These rolls consecutively perform the operations illustrated in the said figures of the drawings. The carrying wheel, 25, is rotated by a belt, 40, passing under guide pulleys, 42, and around a pulley, 43, on the main or power shaft, 44. Shaft 44 is provided with fast and loose pulleys and with a clutch which is operated by depression of a pedal, 19, and a pedal-rod, 17.

The seaming rolls, 22, 23, and 24, are provided with radially-movable bearings held in radial slots in the wheel, 25, and suitable means are provided for automatically and sequentially moving said rolls inwardly into operating position, holding them there, and withdrawing them. As shown, these movements are accomplished by means of mechanism comprising a cam, 60, a lever, 55, oscillated thereby, a sliding cam, 50, operated by said lever, and short unequal levers, 47, 48, and 49, rocked by the sliding cam, 50, and engaging pins, 27', on the roller bearing slides, 27. Said cam, 50, when moved down, strikes first the longest lever, 47, then the next shorter lever, 48, and lastly, the shortest lever, 49. The main cam, 60, is rotated by a worm gear, 62—63, the worm, 63, being loosely mounted on the power shaft, 44, and started and stopped by the action of the clutch. The parts are so geared that the roll-carrying wheel, 25, makes many revolutions to each revolution of the cam wheel, 60, and at the end of the first revolution of said wheel the first seaming roll, 22, is retracted while the second roll, 23, is pushed in; at the end of its revolution around the can it is retracted and the finishing roll, 24, is pushed in; and the revolving parts are automatically stopped after one revolution of the finishing roll. When the irregular cans are to be seamed; a device shown in Figs. XI, XII, and XIII is used. The sequence of operation of the seaming rolls is then controlled by the cams, 50 and 60, in the regular way, and the rolls are caused to follow the can periphery by means of a suitably-formed fixed cam.

The operation having thus been outlined, we will proceed to describe the detailed structure shown in the drawings. In Figs. VIII, IX, and X, a can-head, 7, is shown as depressed below its peripheral flange, or having said flange struck up and out; hence the upper chuck-plate, 8, is formed to fit snugly within said flange and upon the can-head. This chuck-plate is of course detachable, and other interchangeable chuck-plates of different sizes are provided.

The can-supporting rest, 9, is provided with a depending stem, 10, vertically slidable in the bracket, 3. The chuck-lever, 11, is fulcrumed at 12 on an inwardly extending part 3' of the bracket, 3. The end of this lever is pivotally connected at 13 to a sleeve, 14, that is slidable on stem, 10; a compression spring, 15, is placed between the sleeve 13 and a shoulder on said stem. The opposite end of lever, 11, is loosely connected at 16 to a vertical bar, 17, by which the aforesaid clutch is operated. The bracket, 3, is vertically adjustable, for adjusting the can-rest, 9, at different heights. The actuating bar, 17, is provided with a series of holes, 18, to receive the pivot pin, 16, in the different positions of said lever.

The bar, 17, may be actuated automatically, but in this machine it is actuated by a pedal, 19, on a lever, 19', fulcrumed on a bracket, 20. The pedal lever is automatically elevated by a stout spring, 21. As the pedal strokes will vary in force or length, the telescopic connection to the stem, 10, is provided, and spring, 15, takes up the excess motion of lever, 11, when the pedal is depressed by the operator.

The can with its loose head, being placed upon the can-rest, 9, it is operated upon by the seaming mechanism, which will now be described. The forming of a seam of the kind shown in Fig. X requires three operations: first the crimping the edge of the head, 7, beneath the end flange of the can body 6; second, the bending this first seam down and inwardly; third and finally, the squeezing the seam thus bent, inwardly upon the can body. The three rolls, 22, 23, and 24, respectively perform these operations. The first-acting roll, 22, is formed with a narrow curved groove, 22', that receives the edge of the can head and turns it down over the can body-flange, while a flange, 22'', on said roll prevents the can head from bulging upwardly during that operation. The second acting roll, 23, is provided with two flanges, between which is a tapering or coniform surface, 23'. This roll being forced in (i. e. toward the can) its surface, 23' impinges upon the periphery of the first seam and bends the seam down and inwardly to the angle shown in Fig. 9. The finishing roll, 24, is provided with two flanges, and between them, with a cylindrical surface, 24', which squeezes the projecting seam in upon the can, as shown in Fig. X.

As shown in Fig. II, the carrying wheel, 25, is preferably provided with three heavy webs or spokes, 26, which are radially slotted to hold and guide an equal number of slides, 27, which carry the respective seaming rolls. This form of seam is preferred by some and can also be made with three rollers, the first roller in such case being of a shape differing from that described. The details of this, the preferred construction, are shown in Figs. II, III, VI, and VIII, and a description of one roll-carrying device will answer for the three.

The slide, 27, is provided upon its upper edge with two supporting flanges, 27'', which rest upon the web or spoke, 26, thereby supporting the slide, which extends slightly below the under face of the web, and is held against upward movement by a gib, 28, tightly drawn against it by a bolt, 29, and nut, 30. The upper edges of the gib, 28, are finished off so as not to bear tightly upon the web surfaces and cause the slide to stick.

Beneath the gib, 28, is a stud-block, 31, on which is milled the stud or spindle, 32, of the seaming roll. The stud-block is non-rotatably fitted to the gib, and is of course slightly longer than the roll, whereby the retaining washer, 33, that is locked upon it by the nut, 30, will not bind upon said roll.

To provide for radial adjustments of the rolls, for seaming cans of various diameters, the slide, 27, is radially slotted so that the bolt, 29, may be readily shifted toward or from the center. The upper portion of the radial slot is wider, to receive the head of said bolt, but prevents the bolt from being turned.

Each of the seaming rolls is mounted for rigid support and radial movement as above described.

The carrying wheel, 25, is fixed upon the lower end of a shaft, 35, by a screw, 36, or other suitable means. As shown, the screw, 36, secures also the circular chuck or mandrel plate, 8, which has been already referred to. Shaft, 35, is non-rotatable, and it is depended upon to hold the chuck plate 8, stationary and for another reason hereinafter made apparent. The upper portion, 35', of said shaft is fixed in a massive bearing, 38, comprising the bracket, 4. The hub, 25', of the wheel, 25, is preferably engaged by the bearing, 38, to prevent end play of the wheel. The weight of said wheel and parts carried thereby is borne by an antifriction collar, 39, placed between the hub and the chuck plate, 8. The lateral pull of the drive-belt, 40, upon the wheel is taken off the shaft, 35, by means of one or more antifriction rollers, 41, arranged in contact with the face of said wheel and in proper position to receive the thrust thereof. The belt, 40, passes around two guide-pulleys, 42, and up around a pulley, 43, fixed upon the power shaft, 44, adjacent the fast and loose pulleys, 45 and 46.

Returning to the carrying-wheel, 25, and the slides, 27, carried thereby, we will state that the requisite movements of said slides, radially within the wheel, may be accomplished by a variety of mechanisms. The preferred mechanism only is shown in the drawings and is as follows: The three levers, 47, 48, and 49, that respectively move the slides, 27, are pivoted on pins, 47', held in lugs, 49', cast upon a collar, 49'', that fits tightly the wheel-hub, 25', above the plane of the slides. The lower ends of said levers are bifurcated and depend into the radial slots to engage cross-pins, 27', the ends of which are fitted in holes in the slides. The upper ends of the levers are formed with inwardly pointing noses, 47ª, 48ª, and 49ª, beneath which are formed recesses, 47ᵇ, 48ᵇ, and 49ᵇ.

As well shown in Figs. I and III, a circular sliding cam, 50ª, is mounted on the wheel hub, 25', and is provided with two oppositely beveled faces, 50 and 50', both of which are adapted to engage the noses of levers, 47, 48, and 49. It should be explained at this point that the slides, 27, are always pressed outwardly by expansion springs, 51, respectively shown in Figs. VIII, IX, and X of the drawings. Therefore the only essential function of the three levers is to force the slides inwardly, in the proper sequence, and to release them at the proper times, thereby allowing said springs to move the slides outwardly.

Normally the cam, 50, is elevated above the nose of the longest of the levers: that is, its lower bevel, 50', is either above or in contact with, said nose, and is therefore above all three. The fulcrum pins, 47', of said levers are, as shown in Figs. VIII, IX, and X, disposed similarly in each lever, the object of which is to cause equal radial movements of the three seaming rolls when the cam, 50, descends. Said cam is provided with two annular flanges, 52, or otherwise with a groove, 53, for the reception of the yoked end, 54, of the cam lever, 55. Said yoked end may be provided with antifriction rollers, 56. Lever, 55, is fulcrumed on a pin, 57, held by bracket, 4, and its opposite end carries a cam-groove roller, 58. Said roller is guided or actuated by the sinuous cam-groove, 59, in the heavy cylindrical cam wheel, 60, which turns upon a vertical stub-shaft, 61 (Fig. II) whereon is also shown a worm wheel, 62, secured by screws or otherwise to the upper face of the cam wheel. The worm, 63, which drives the worm wheel, is freely mounted on the power shaft, 44, but is driven through the medium of a suitable clutch. Any style of clutch may be employed; that shown is constructed as follows: The worm hub, 63, is made integral with or secured to an outer clutch member, 64, which is simply a cylindrical flange. The inner coengaging clutch member comprises a circular disk, 65 (see Fig. V) having a hub, 65', and two integral or attached resilient expansible members, 65'', the ends of which are turned inwardly and at an angle to each other, the disk, 65, being recessed as shown, around these ends. Normally the resilient parts, 65'', are not in contact with the outer clutch member, 64, but if their ends be further separated, the parts, 65'', will be moved into such contact. The clutch-operating member comprises a sliding hub, 66, having flanges, 66', and carrying a wedge-shaped finger, 67, (Fig. IV) the end of which is always between the ends of said resilient parts, 65'', and which is adapted, when forced toward the clutch, to spread said parts to close the clutch and start the rotation of the worm, 63. A collar, 68, is fixed upon the shaft, 44, to receive the thrust of said worm if the machine should be run backward.

The closed and open positions of the clutch-lever 69, and the coöperating parts, are shown respectively in Figs. III and IV. The clutch-lever, 69, is pivoted on a pin, 70, and its lower end is formed with an inclined surface, 70'. This surface is engaged by a crosspin, 71, carried by a horizontally disposed lever, 72, in such manner that when lever, 72, descends, the stud, 71, pushes back the lower end of the lever, 69, thereby throwing in the clutch-wedge, 67. The reverse movement of lever, 69, is caused by the ascending upper end of the connecting rod or bar, 17, engaging the surface opposite the surface, 70', said rod or bar being pivotally connected to lever, 72, by a pin or bolt, 73. Said lever, 72, is longitudinally slotted to receive the lever, 69, and the upper end of bar, 17, also to receive a dog, latch or detent, 74, pivoted on a rock-shaft, 75. This detent, when lever 72 is fully depressed, is, by a spring, caused to slip over the crosspin, 71, and in such position holds said lever down until the detent is disengaged. The spring, 78, that actuates the detent, 74, is shown in Fig. VII and is connected to a rock-arm, 77, and to a fixed arm, 76, on the rock-shaft bearing. The disengagement of the detent is preferably controlled by a cam lug, 79, carried by the lower face of the cam wheel, 60. Cam lug, 79, once in each revolution, strikes and depresses rock-arm, 77, fixed upon the detent shaft, 75, thus retracting the detent from the crosspin, 71. This permits the ascent of the parts connected to lever, 72.

In addition to opening the clutch, when stopping the mechanism, it is desirable to quickly stop the worm, 63, so that the cam wheel, 60, will always stop in the same position, which position is that which holds the sliding cam, 50, up above the slide-levers, 47, 48, and 49. This uniform stoppage of the parts is accomplished by means of a brake, such as that illustrated in Figs. III, IV, and V. As most clearly shown in Fig. V, it comprises the brake shoe, 80, held by guides in position to engage the outer clutch member, 64. The shoe, 80, is provided with three parallel rods, 81, 81, and 82, extending in its line of motion. The shoe is spring pressed. Two of said rods pass through holes in guide-lugs, 83, while the middle rod, 82, is loosely connected to lever, 72, and actuated thereby. As shown it passes through a larger hole or slot in said lever, and is provided with adjustable nuts 84 and 85, to coact with the lever, 72. The action of the brake precedes the action of the clutch, 64—65.

86 indicates the belt-shifter bar, supported by screws, 87, passing into the frame.

As the sliding cam, 50, ascends, its upper bevel 50 rubs against the noses of the slide-levers, 47, 48, whereby the rollers, 22 and 23, are again momentarily thrown into engagement with the can shown. To prevent marking or distorting the finished seam, the nose portions may be made separate from the levers and pivoted thereon, by stop joints, as shown in Fig. XIV. Here the nose, 88, is pivoted on a pin, 89, and provided with a flat heel with a slight projection, 88'. The downward movement of the nose is limited by a stop shoulder, 90, on the lever, 47. A flat spring, 91, secured to the lever, prevents too free movement of the nose and throws it down after it has been lifted by the cam 50.

The operation of the entire machine has been described, but may be recapitulated as follows: The operator sets a can on the can-rest, 9; then places a head, 7, thereon, and then steps on the pedal, 19. This raises the can and thrusts the can head against the chuck-plate, 8. The can rest is held in this position by the detent, 74, which holds the rod or bar, 17. The depression of said bar, 17, closed the clutch, 64, which started the worm, 63, worm wheel, 62, cam 60, lever, 55, cam, 50 and the longest of the three slide-levers, 47. Said lever, 47, pushes in the slide, 27, that carries the first seaming roll, 22, and this roll turns the head flange down over and in under the flange of the can body. The wheel, 25, makes several revolutions during each single revolution of the controller or cam, 60. I prefer that the wheel shall make about nine revolutions during every revolution of the cam, giving approximately two revolutions each for the first and second rollers and three for the finishing roller: that is, each of the seam forming rollers is carried twice around the can and the finishing roller three times. Two revolutions of the wheel are idle, so far as concern the seaming rollers, these two revolutions being utilized in the change from roll to roll and in returning the rollers. The operation of the first seaming roll continues for nearly one-third of the revolution of the cam, 60. The next portion of the revolution of the cam operates to further depress the shifting cam, 50, whereby the first seaming roll is thrown out of action and the second seaming roll into action. The second roll operates to turn the interlocked flanges of the can body and head. In the third stage of revolution of cam, 60, the sleeve or shiftable member, 50, is moved to disengage the second roller, 23, and force the finishing roller, 24, into engagement with the cam seam. The remaining or fourth portion of the revolution of the cam operates to return the shiftable member, 50, and rolls preparatory to the seaming of another can. The cam lug, 79 on the cam wheel, 60, now strikes the detent-releasing arm, 77, and throws the detent, 74, out of engagement with the pin 71, which permits the lever, 72, and brake, 80, to rise and open the clutch, 64—65. The brake instantly stops the worm, 63, and the rod, 17, and pedal 19, are drawn up by spring 21. The can-rest, 9, descends and the operator removes the headed can and places the next unheaded can upon the plate 9.

The substitute attachment for double seaming the heads of irregular cans comprises an extra mechanism, shown in Figs. XI, XII, and XIII, the same being means for causing the rolls to accurately follow the periphery of a square can and exert sufficient pressure thereon to perform the seaming operations. In Figs. XI and XII a preferred mechanism for this purpose is illustrated. As illustrated in this portion of the drawings, a complete attachment is provided, the same having its own shaft, 35", adapted to replace the shaft, 35, in the overhanging bearing, 38. The wheel, 25, serves for both mechanisms.

Fig. XI is a view of the bottom of carrying wheel, the rolls, and their guiding cams. It will be observed that the seaming rolls, 22, 23, and 24, are not carried directly by the radial slides, 27. Instead thereof, they are carried respectively by cam-levers, each of which consists of two arms, 96 and 97, an offset portion, 98, and an upper pivot-arm, 99, as most clearly shown in Fig. XIII. Arm 99 is provided with a round hole, 99', which is mounted on the stud, 32, in place of the roll itself, and is held thereon by a suitable screw, 100, in place of the nut, 30. Or, a more rigid support for the cam-lever, 96—97, is obtained by substituting an extended stud-block, 101, for that shown in Fig. X, the block, 101, being long enough to receive a second fastening-screw, 102, which, with bolt, 103, secures the block to the slide, 27.

The lever arms, 97, carry the seaming rolls as shown, by means of studs, 104, and the lever arms, 96, carry upon their upper faces cam rollers, 105. It is now evident that the three cam-rollers, 105, may be guided by suitably formed cams in such manner that the rolls will follow a can of any shape—either circular or noncircular. Therefore, it is only necessary to provide stationary cams of various shapes, that shall cause the rolls to follow cans of various shapes and sizes. The cam, 106, shown in the drawings will cause the rolls to follow the periphery of the can where the cam-levers are arranged as shown. The rollers, 105, are guided by the cam-groove, 107, the inner surface, 107', of which is the active surface as it holds the rolls to their work. The outer surface, 107" of the cam groove holds the rolls away from the can when the slides, 27, carrying the cam-levers are in outward position, and also prevents wabbling of the cam-levers.

The cam, 106, is held stationary. As shown it is provided with a hub, 106', which is keyed upon the lower end of the nonrotative shaft, 35". The portion, 35', of said shaft may be squared, as shown at 35ª, to enter a square hole through the cam hub. The cam, 106, is supported by the chuck-plate, 8, which is secured to the shaft, 35", by a screw, 36.

The wheel, 25, being rotated (preferably in the direction of the arrow, d", see Fig. XI) it carries with it the cam-levers, 96—97, and the rolls, 22, 23, and 24. The roll-carrying slides, 27, are successively forced in during one revolution of the cam, 60, then pushed out by springs, 51, as heretofore described, and the inner cam-surface, 107', permits each roll to move outward as it passes around the corners of the can, while holding it solidly in working position.

The cam-levers might be fulcrumed upon the outer screw, 102, or closer to the periphery of the wheel, but the arrangement shown is preferable, for mechanical reasons.

Various modifications of our invention will suggest themselves to one skilled in the art. This being true, we do not confine the invention to the specific constructions herein shown and described.

Having thus described our invention, we claim as new and desire to secure by Letters Patent:

1. In a machine in the class described, a shaft in combination with a carrying wheel thereon, said wheel provided with a plurality of radial guides, blocks movable in respective guides, seaming devices operated by respective blocks, block operating levers occupying substantially vertical positions, and pivoted upon said wheel at different elevations, the upper ends of said levers extending to different heights, a single cam on said shaft movable vertically to successively operate said levers and means for actuating said cam, substantially as described.

2. In a machine of the class described, a rotative wheel, a radially slidable roll-carrying block mounted on the wheel, a cam slidable on the shaft of the wheel, a lever arranged to transmit motion from said cam to said block, and means for actuating said cam; substantially as described.

3. In a machine of the class described, a rotative wheel, a shaft for said wheel, a radially slidable roll-carrying block mounted on the wheel, a cam slidable on said shaft, a lever pivoted upon said shaft and arranged to transmit motion from said cam to said block, means for actuating said cam to move the block inwardly, and a spring for moving the block outwardly; substantially as described.

4. In a machine of the class described, a wheel, a plurality of radially slidable carriers for seaming devices, carried by the wheel, levers respectively engaging said carriers, said levers being differently formed, and a cam slidably mounted on said shaft and adapted to operate said levers one at a time to force said carriers inwardly; substantially as described.

5. In a machine of the class described, a wheel, a plurality of radially slidable carriers for seaming devices, carried by the wheel, levers respectively engaging said carriers, said levers being differently formed, a cam slidably mounted on said shaft and adapted to operate said levers one at a time to force said carriers inwardly, and means for automatically actuating said cam; substantially as described.

6. In a machine of the class described, a rotative carrying-wheel, in combination with seaming devices carried thereby, a cam wheel the axis of which is parallel with that of the carrying wheel, the speed of the seam-roll carrying wheel being a multiple of that of said cam wheel, and mechanism actuated by the cam wheel to move the seaming devices, one at a time, against the work and hold each in that position during one rotation of said carrying wheel; substantially as described.

7. In a machine of the class described, a power shaft, and a cam driven therefrom, in combination with a fixed shaft, a wheel thereon, said wheel carrying radially-movable seaming devices, driving gear between said wheel and the power-shaft, a lever oscillated by said cam, and means actuated by said lever for moving the seaming devices one at a time in against the work, holding them in operative position, and causing them to recede from the work, in the same order; substantially as described.

8. In a machine of the class described, a vertically-movable can-rest, a rod, a power-shaft, seaming mechanism driven therefrom, an interposed clutch, a brake normally disengaged from the outer clutch member, and means actuated by said rod for lowering said can rest, opening the clutch, and stopping said mechanism by applying said brake to the outer clutch member: substantially as described.

9. In a machine of the class described, a power-shaft, a clutch thereon, a cam driven by said shaft, seaming mechanism so driven, a detent for holding said clutch in closed position, means actuated by said cam for tripping said detent, and means for then opening the clutch to stop the seaming mechanism; substantially as described.

10. In a machine of the class described, a power-shaft, a clutch thereon, a cam and seaming mechanism both driven from the power-shaft, a lever and a detent for holding said clutch in closed position, a vertically movable can-rest, a rod connected to said lever and to the can-rest, means actuated by said cam, for tripping said detent when a seam is formed, and means for then actuating said rod to lower the can-rest and open the clutch, substantially as described.

11. In a machine of the class described, a fixed shaft, a wheel rotatively held thereon, a stationary cam held by said shaft beneath said wheel, a radial slide mounted in said wheel, a cam-lever pivoted on said slide, said lever being guided by said cam and holding a seaming device, in combination with means for rotating said wheel to revolve the seaming device around a can; substantially as described.

12. In a machine of the class described, a fixed shaft, a wheel rotatively mounted thereon, a fixed cam and a can-chuck held by said shaft beneath said wheel, said cam having a cam-groove, and means for rotating said wheel, in combination with a slide carried by said wheel, said slide being adjustable toward and from the periphery of said wheel, a cam-lever pivoted on said slide, and guided by said cam groove, and a seaming device held by said cam-lever; substantially as described.

13. In a machine of the class described, a fixed shaft, a wheel rotatively held thereon, a stationary cam held by said shaft beneath said wheel, a radial slide mounted in said wheel, a cam-lever pivoted on said slide, said lever being guided by said cam and holding a seaming device, in combination with means for rotating said wheel to revolve the seaming device around a can, and means acting upon said slide for holding the seaming device in against the work during one revolution of the seaming device around a can; substantially as described.

14. In a machine of the class described, a fixed shaft, a wheel rotatively mounted thereon, a fixed cam held by said shaft adjacent to said wheel, a plurality of radially-slidable blocks carried by said wheel, cam-levers carried by said blocks, each cam-lever being guided by said cam; a plurality of differently-formed seamers held by said cam-levers, each of said seamers performing a different operation upon the seam; means for rotating said wheel and thereby revolving the seamers around the work; means for automatically moving said sliding blocks inwardly to hold the seamers one at a time against the work; and means for disengaging them from the work in the same order; substantially as described.

15. In a machine of the class described, a shaft, a carrying wheel thereon, a plurality of radially movable seaming devices carried by said wheel, levers of different lengths pivoted upon said wheel at different heights, and a cam for operating said levers successively to move respective seaming devices inwardly against the work, substantially as described.

16. In a machine of the class described, a shaft, a carrying wheel thereon, a plurality of radially movable seaming devices carried by said wheel, levers of different lengths pivoted upon said wheel, and a cam movable step by step for operating said levers successively to move the seaming devices inwardly against the work, said levers being so pivoted that the movement of the seaming devices is uniform substantially as described.

17. In a machine of the class described, a shaft, a carrying wheel thereon, a plurality of radially movable seaming devices occupying the same plane in, and carried by said wheel, levers of different lengths pivoted on the wheel having their lower edges engaged with respective blocks, each said lever being pivoted substantially midway of its ends, a cam for operating said levers successively to move the seaming devices inwardly against the work, and means for retracting each seaming device before the next is thrown into operation, substantially as described.

18. In a machine of the class described, a shaft, a carrying wheel thereon, a plurality of radially movable seaming devices carried by said wheel, levers pivoted at different elevations upon the hub of said wheel, and a single, vertically movable cam for operating said levers successively to move the seaming devices inwardly against the work, substantially as described.

19. In a machine of the class described, a power shaft, a can seaming device driven continuously therefrom, a cam arranged to be driven from said driving shaft, a clutch for throwing said cam into operation, a lever, a detent for holding said clutch in closed position, a vertically movable can rest, a rod connected to said lever and to said can rest, means for moving said rod to operate said lever and said can rest for simultaneously raising the can and starting the machine into operation, means actuated by said cam for tripping said detent when the seam is formed, and means for then actuating said rod to lower the can rest and open the clutch, substantially as described.

20. In a machine of the class described, a power shaft and carrying wheel continuously driven therefrom, in combination with seaming devices radially slidable upon said wheel, levers of different lengths carried by said wheel and adapted to operate said seaming devices, a cam vertically movable upon the shaft of said wheel, and means intermittently operated from said driving shaft for actuating said cam to operate said levers successively, substantially as described.

21. In a machine of the class described, a wheel continuously driven on a vertical axis, a vertical shaft carrying said wheel, a cam vertically movable on said shaft, means for actuating the cam radial guides in said wheel, blocks slidable in respective guides, vertical stud shafts adjustable in respective blocks, seaming rolls mounted upon respective stud shafts, levers pivoted at different heights on the hub of said wheel and engaged with respective blocks, the upper ends of said levers rising to different heights above the wheel for successive engagement with, and operation by, said vertically movable cam, and suitable means for retracting said blocks when respective levers are released by the cam.

In testimony whereof, we have hereunto set our hands, this 23 day of August, 1906, in the presence of two subscribing witnesses.

VICTOR ODQUIST,
HALVOR HEYERDAHL LYCHE.

Witnesses:
CHARLES GILBERT HAWLEY,
M. SIMON.